Oct. 27, 1953  R. G. BIRR ET AL  2,656,756
FABRIC MEASURING AND INSPECTION MACHINE
Filed May 26, 1949  4 Sheets-Sheet 1

Inventors,
Rudolph G. Birr.
Paul W. Jespersen
By. Harold Olsen
Attorney.

Oct. 27, 1953 R. G. BIRR ET AL 2,656,756
FABRIC MEASURING AND INSPECTION MACHINE
Filed May 26, 1949 4 Sheets-Sheet 2

Inventors,
Rudolph G. Birr,
Paul W. Jespersen.
By Harold Olsen
Attorney.

Oct. 27, 1953  R. G. BIRR ET AL  2,656,756
FABRIC MEASURING AND INSPECTION MACHINE
Filed May 26, 1949  4 Sheets-Sheet 3
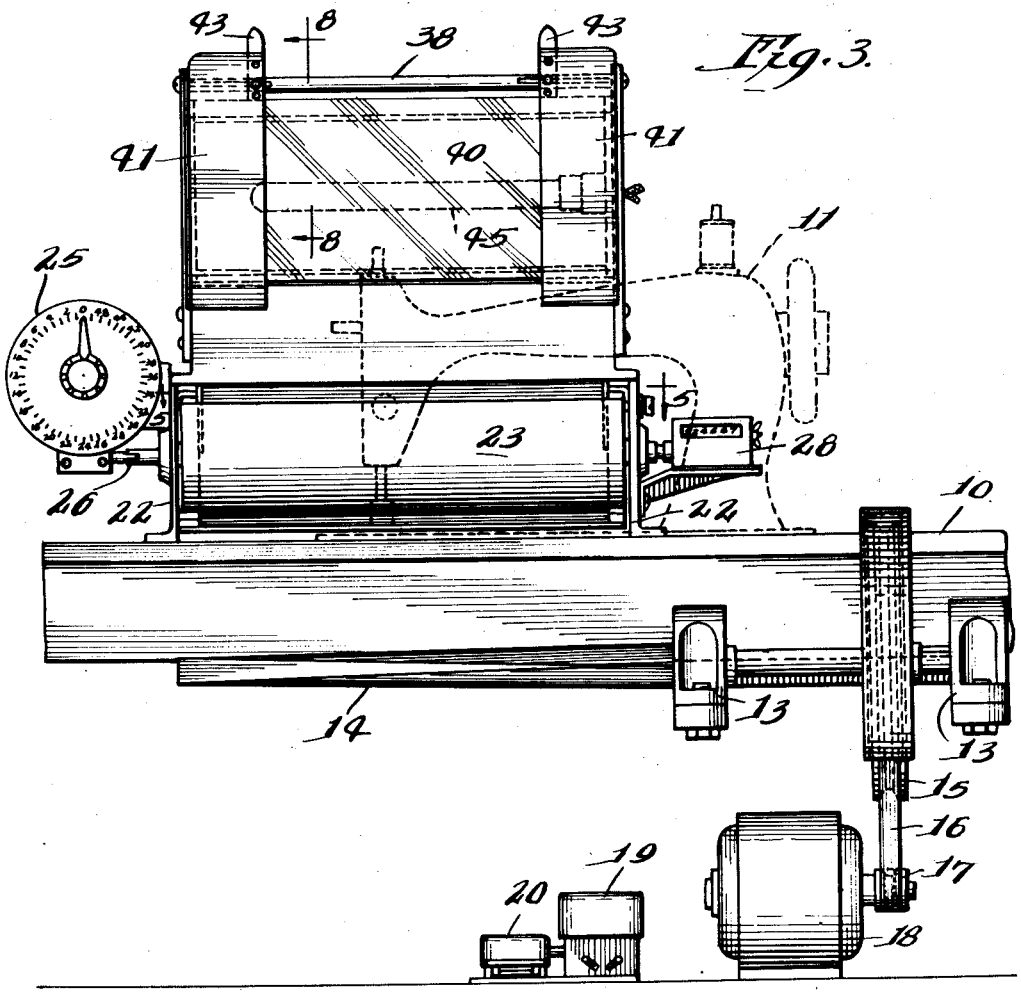
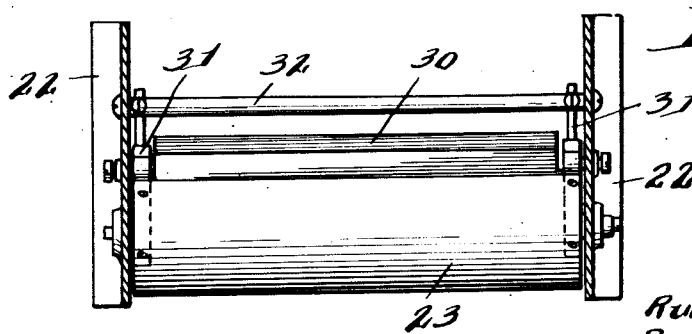
Inventors
Rudolph G. Birr.
Paul W. Jespersen.
By. Harold Olsen
Attorney.

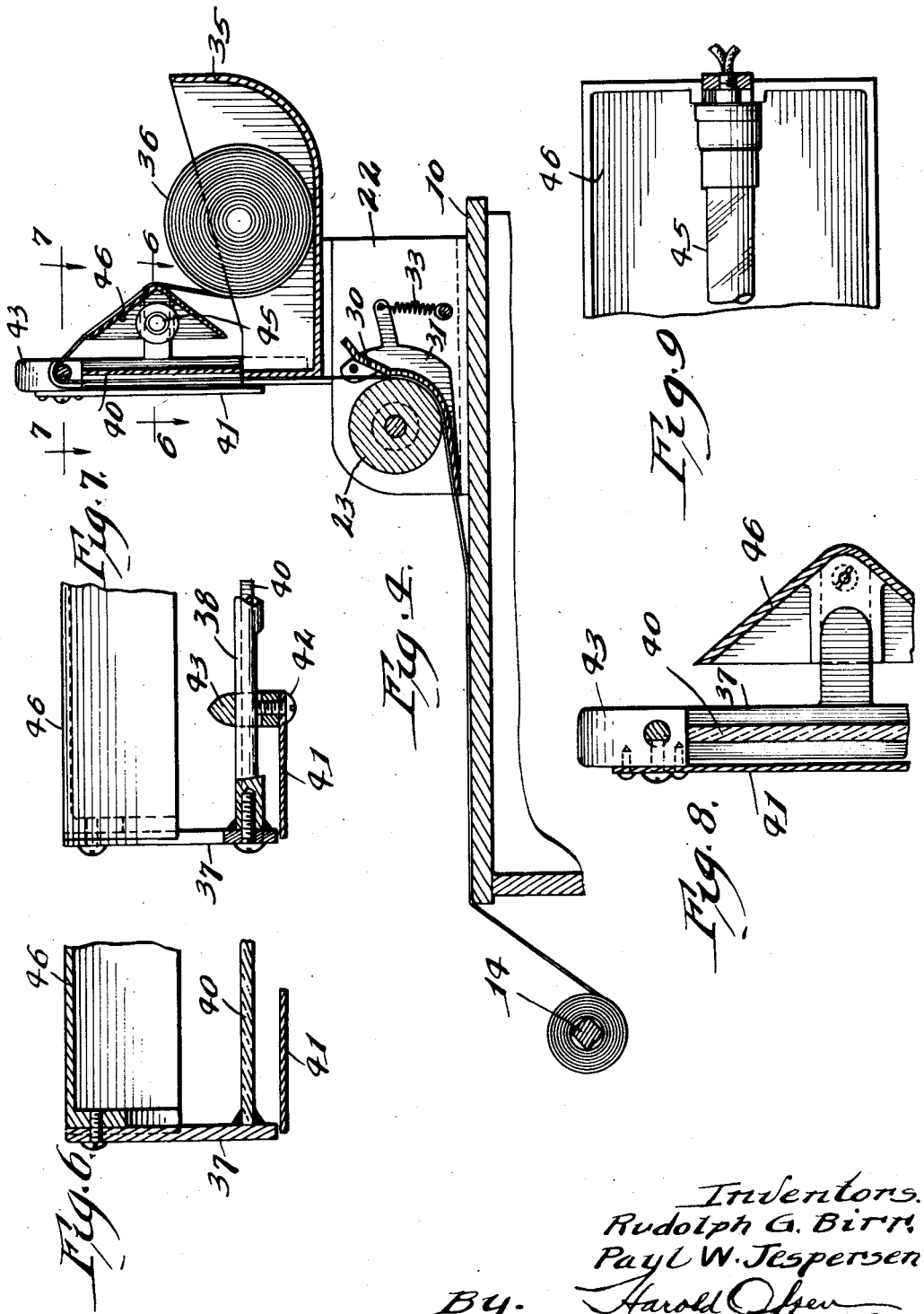

Patented Oct. 27, 1953

2,656,756

UNITED STATES PATENT OFFICE 2,656,756

FABRIC MEASURING AND INSPECTION MACHINE

Rudolph G. Birr, Lombard, and Paul W. Jespersen, Wilmette, Ill., assignors to American Linen Supply Co., Carson City, Nev., a corporation of Nevada Application May 26, 1949, Serial No. 95,466

9 Claims. (Cl. 88—14)

This invention relates to machines for accurately measuring the length of webs of fabric while exposing the fabric to view so that flaws, tears and stains may be readily and quickly detected during the measuring operation.

Our machine is particularly designed to be used by linen service companies and laundries which supply rolls of toweling to be dispensed in so-called continuous towel cabinets.

Such continuous towels are usually supplied in rolls containing upwards of fifty yards, more or less, of toweling. In course of use, such continuous towels are often damaged by rips, tears and holes and sometimes they are indelibly stained. It also happens that the length of the towel is sometimes diminished by persons who cut pieces from it. In its normal operation, a linen supply company employs workers to inspect such continuous towels to detect any flaws in them, to repair such flaws, and also to measure the length of the towel so that it may be determined accurately whether the customer gets what he pays for.

Heretofore, the procedures above outlined have been rather tedious and have necessitated the employment of extra labor, especially in the plants where large numbers of such towels are inspected, repaired and measured in the course of a day's work.

While our machine is designed particularly for use in the linen supply industry, it will be readily apparent that our machine may also be employed in other industries where it is desired accurately to measure the length of webs of fabric and to inspect the material for flaws during the measuring operation.

It is an object of our invention to provide a machine having the desirable characteristics above pointed out and in which the length of the towel may be very accurately and automatically measured.

It is a further object of our invention to provide a machine of the character set forth with an inspection screen cooperating with a source of light over which the towel travels to the measuring roll so as to clearly reveal any flaws or defects in the toweling.

A further object of our invention is to provide a machine of the character described with an illuminated inspection screen provided with adjustable guide members which may be set in accordance with the width of the towel to be inspected and measured.

Still another object of our invention is to provide a machine of the character described with a measuring roll and a cooperating brake therefor so arranged that rotation of the measuring roll will instantly stop when there is no fabric between it and the brake.

Still another object of our invention is to provide a machine of the character described with a source of illumination for the inspection screen arranged electrically in series with an electric motor which supplies power to the wind-up shaft so that the light is illuminated only when fabric is being wound up and passing through the machine.

Other objects of our invention and the advantages thereof will be more fully pointed out as the description proceeds.

In the accompanying drawings we have illustrated a practical embodiment of our invention. These drawings are illustrative merely and it will be readily apparent to those skilled in the art that the structural features disclosed may be varied greatly without departing from the spirit of our invention or sacrificing any of the advantages thereof.

In the drawings,

Fig. 3 is a front elevation;

Fig. 4 is a vertical sectional view taken substantially centrally of the machine;

Fig. 5 is a fragmentary horizontal section taken substantially on line 5—5 of Fig. 3;

Fig. 6 is a fragmentary sectional view taken on line 6—6 of Fig. 4;

Fig. 7 is a fragmentary sectional view taken substantially on line 7—7 of Fig. 4;

Fig. 8 is a fragmentary sectional view on line 8—8 of Fig. 3; and

Fig. 9 is a fragmentary sectional view taken on line 9—9 of Fig. 2.

Figure 1:
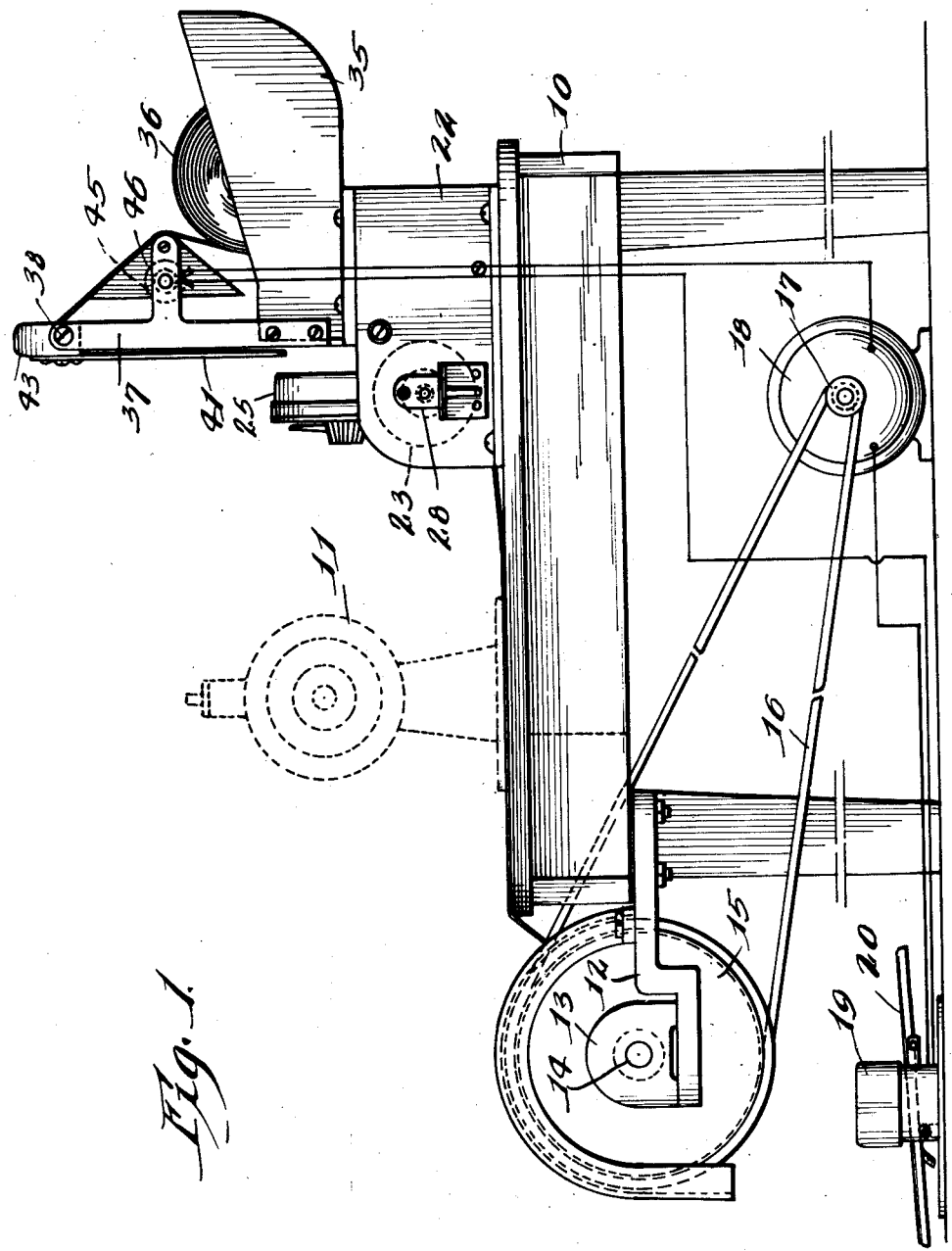
Fig. 1 is a view in side elevation of a machine embodying our invention, said view containing also a schematic wiring diagram of the electric circuits involved.
Figure 2:
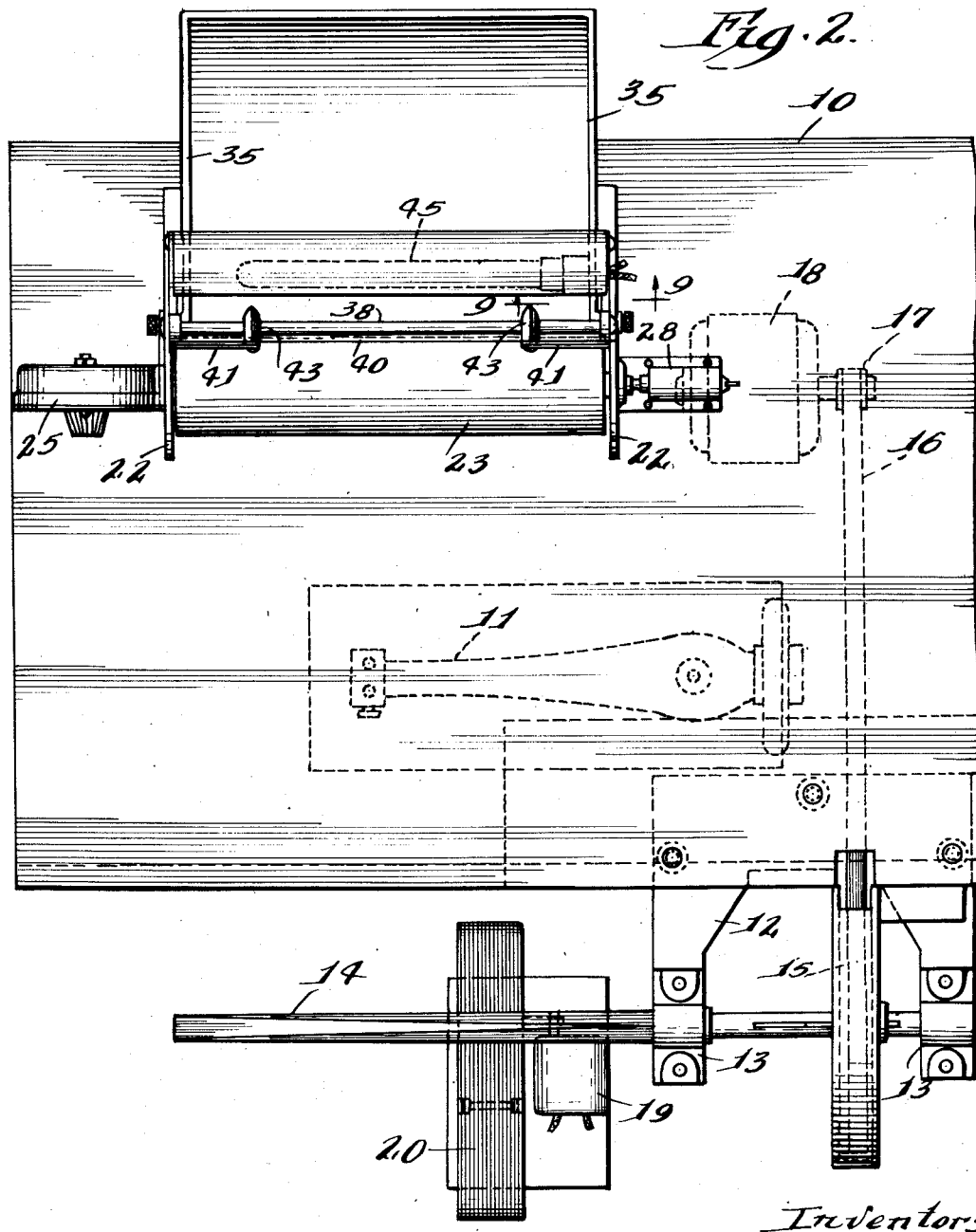
Fig. 2 is a plan view of our machine.

Referring now to the drawings, reference numeral 10 indicates a suitable table upon which the machine of our invention may be mounted. Since in the use of our machine the operator will stop to make such repairs as may be made by special sewing machines designed for that purpose, we have shown in dotted lines such a machine and indicated the same by the reference numeral 11.

Near the front edge of the table 10, we have secured a bifurcated bracket 12 having bearings 13 for a wind-up shaft or mandrel 14. The mandrel 14 is provided with a pulley 15 designed to be driven by a suitable belt 16 from a pulley 17 on a suitable electric motor 18.

Electric current for the motor is supplied from any convenient source and is controlled by a switch 19 operated by a foot treadle 20.

Our machine comprises a pair of vertically extending supporting plates 22 suitably secured to the top of the table 10 and near the back edge of said table, thus providing room between the machine and the front of the table for the mounting of the sewing machine 11 above referred to.

A measuring roll 23 is suitably journaled for rotation in the vertical supporting plates 22 and near the front thereof. Said measuring roll is preferably made of rubber or other suitable somewhat compressible material or it may be made of relatively hard material covered with rubber or other similar substance. In actual practice we have found that this roller should have a surface hardness quite similar to that of the rubber covered rollers of an ordinary clothes wringer.

A measuring dial and a yardage indicator 25 is secured to one of the vertically extending supporting plates 22 and is connected by a suitable coupling 26 to the shaft of the measuring roll 23. Said measuring device may be of any suitable form and may include a dial bearing appropriate indicia and a pointer cooperating therewith to indicate the length of fabric which has passed around the measuring roll 23.

At the side of the machine opposite the place where the measuring dial is located, we have mounted a suitable counter 28 for indicating the number of towels which have been inspected and measured by the machine. This counter is suitably connected to the shaft of the measuring roll 23 and may be of any standard and well known construction.

In back of the measuring roll 23, we provide a cooperating fabric guide and brake shoe 30 having supporting brackets 31 for pivotally mounting said brake shoe and guide 30 upon a rod 32 extending between the supporting standards 22. Said brackets 31 are provided with springs 33 secured to the plates 22 which springs tend to rock the guide and brake shoe 30 about its pivots and into firm engagement with the surface of the measuring roll 23.

The foregoing arrangement is such that when the machine is put into operation, the fabric guide and brake shoe 30 must be moved away from the measuring roll 23 against the action of the springs 33 to provide sufficient clearance for the passage of the fabric around the said roll 23. Whenever there is no fabric between the measuring roll and the brake shoe, the latter bears so firmly against the roll 23 that the rotation of said roll is instantly stopped. In this way a very accurate measurement of the length of the fabric is obtained.

A fabric-receiving trough 35 is suitably secured to the top of the vertically extending plates 22. This trough is designed to receive the fabric to be inspected and measured. In the case of continuous towel inspection and measuring, this fabric will be in the form of a roll 36.

Vertically extending frame members 37 are secured to the trough 35, the tops of which are connected by a rod 38. The vertically extending members 37 support between them an inspection screen 40 which may be made of suitable light-transmitting material. Preferably this light-transmitting screen or panel 40 is made of plastic material having quite high light-transmitting properties and a surface that will efficiently diffuse light passing through it. Of course, so-called ground glass may also be used for this purpose but with glass there is always the danger of breakage and the necessity of replacement.

Upon the rod 38 and in front of the screen 40 we have mounted for relative horizontal adjustment a pair of shields 41 which may be held in adjusted position on the rod 38 by suitable set screws 42. Said set screws 42 enter in brackets 43 which extend upwardly above the rod 38. By reason of the adjustment referred to, these brackets 43 may be fixed at a distance equal to the width of the fabric to be measured and inspected and thus they form a guide for the passage of the fabric over the rod 38 and downwardly in front of the screen 40 into position between the measuring roll 23 and the brake shoe 30.

Preferably the shields 41 are made of opaque material, either metal or plastic, so as to prevent the passage of light therethrough and to confine the passage of light to that area of the screen 40 which is covered by the fabric 36.

In order quickly and positively to reveal any flaws in the fabric such as rips, tears, holes, stains, and the like, we provide a source of illumination 45 located in back of the screen 40. Said source of light 45 may be any convenient and available electric lamp but preferably it is of the elongated type (as shown in Fig. 3) so as to have uniform light distribution over substantially the entire area of the screen 40.

The source of light 45 is housed within a suitable reflector 46, preferably of the configuration shown in Figs. 1 and 4. This reflector will aid in the uniform distribution of light from the source 45 over the entire surface of the screen 40.

By reference to Figs. 1 and 4, it will also be noted that the upper sloping surface of the reflector 46 serves as a guide for the fabric web 36 in its passage upwardly from the trough 35 to the rod 38.

By reference to the wiring diagram shown in Fig. 1, it will be seen that the light source 45 is connected in series with the motor 18. The result of this arrangement is that the light will be illuminated only when the motor is operating to wind fabric on the mandrel 14. Thus, whenever the operation of the motor is stopped, as for example when the worker is engaged in making a repair in the fabric by operation of the sewing machine 11, or otherwise, there will be no glare of light in the operator's eyes from the screen 40.

It is believed that the foregoing description will make our invention entirely clear to those skilled in the art and that the operation of our machine will readily be understood.

At the start, the operator places a roll of fabric or toweling 36 in the trough 35 and draws the end of the fabric along the sloping surface of the reflector 46 and around the rod 38. The guides 43 will then be adjusted to conform to the exact width of the fabric. The operator continues to draw the fabric downwardly across the face of the screen 40 and between the surface of the measuring roll 23 and the brake shoe 30. Drawing the fabric forwardly towards the edge of the table will cause rotation of the measuring roll 23 and a corresponding operation of the measurement-indicating device 25. A few wraps are then made around the mandrel 14. Thereupon the operator steps on the treadle 20 thus closing the electric circuit to the motor 18 and to the light 45. The motor 18 will now drive the mandrel 14 so that the fabric is drawn downwardly across the face of the screen 40. During this operation the worker's gaze is directed at the fabric as it passes across the face of the screen 40. By reason of the illumination of the screen, all defects in the fabric are readily detected. If no flaws are seen, the operation continues until the entire roll of fabric 36 has been wound up on the mandrel 14. As soon as the trailing edge of the fabric clears the undersurface of the measuring roll 23, the brake shoe 30 goes into operation instantly to stop rotation of the roll 23. In this way the measurement-indicating device 25 will reveal accurately the length of fabric which has been drawn through the machine.

It will be understood, of course, that whenever in the inspection a flaw is revealed, the operator will stop the motor 18 by relieving pressure on the foot treadle 20 and then adjust the area of the fabric containing the flaw for repair by the sewing machine 11, or in any other convenient and usual manner.

That part of the table between the rule 23 and the mandrel, is a repair area. Regarding repair of the length of the washed toweling after a tear has been discovered by inspection, and before the length of the toweling is rewound, the position of the measuring roll 23 in relation to the screen 40, the top surface of the table 10, and the mandrel 14 will be particularly noted. The roll 23 has a function other than length-measuring. It serves also as a fabric guide and fabric-positioning roll and as a length-counter. It functions to hold the upright portion of the toweling in proper relation to the screen 40 and serves to hold the horizontal portion of the length of the toweling close to the horizontal top surface of the table in the towel repair area between itself and the mandrel 14. It, therefore, holds the toweling in a position to facilitate repair by the sewing machine 11, and by an operator seated at the mandrel 14 who is in position to inspect the toweling, to remove the wound toweling in an axial direction from the mandrel, to operate a switch to stop winding, while repair is made, and to start winding thereafter.

We claim as our invention:

1. In a fabric measuring and inspection machine, a table, means above the top of and mounted adjacent one end of and on said table for supporting a supply of fabric to be measured and inspected, a mandrel rotatably supported adjacent to but beyond the opposite end of and below the top of said table for winding up said fabric, an upright illuminable inspection screen in the path of travel of the fabric from said supporting means to said mandrel, a measuring roll below said screen near the top of the table in said path of travel and adapted to be contacted by the fabric, means for rotating said mandrel to draw the fabric from said supporting means whereby said measuring roll is rotated, and a counting device operated by rotation of said measuring roll.

2. A device of the class described comprising, a table, an inspection screen supported on and in upright position above the table, a winding mandrel on and at one end of the table but disposed at a level below the top surface thereof, a roll above and close to said top surface, and downwardly and around which the fabric passes on its way to the mandrel after leaving the inspection screen, that portion of the fabric between said roll and said mandrel being held by said roll in flat closely adjacent relation to said top surface of said table to facilitate repair of the fabric before being sewn on said mandrel.

3. A fabric inspection and repair machine comprising a table, having disposed in sequence thereon, a fabric supply receptacle, an upright illuminated inspection screen, and a measuring roll all on and above the top of the table, said measuring roll being close to the top surface of the table, a winding mandrel on and at one end of the table and at a level below the table top, the devices being so arranged that the fabric is trained upwardly from the supply receptacle, thence over and downwardly in front of the screen, thence around the measuring roll, thence close to said top and to the mandrel, and a plate-like brake shoe associated with the measuring roll to form a throat and to act as a guide for directing the fabric into flat and close relation to the table top, and means urging the shoe to press the fabric against the roll during measuring and for urging said shoe into braking engagement with the roll when no fabric is between the plate and the roll.

4. A device of the class described comprising a table, having a winding mandrel thereon at one end and at a level below the top of the table but so that an operator while seated at the table can remove the wound material therefrom in an axial direction, said table having thereon and rising therefrom an upright illuminated inspection screen clearly viewable by the seated operator, and having at its rear a housing inclosing an inspection light, a fabric support above the screen, a measuring roll below the screen near the top surface of the table, and over which support and roll the fabric is trained to be in inspecting relation with the screen, and close to the top of the table as it approaches the mandrel, and a cloth supply holder rearwardly of the light housing and so positioned that fabric on the way to said support is dragged against the housing to smooth and put tension thereon.

5. A device of the class described comprising a table, having a winding mandrel at one end so positioned that the fabric on the way to it drags against the corner of the table and lies flatly and close to the top of the table while being wound, and so that an operator seated at the table can remove the wound material therefrom in an axial direction, said table having on and rising therefrom an upright inspection screen viewable by the seated operator and having an inspection light, a support above the screen, and a measuring roll below the screen close to the top surface of the table and over which support and roll the cloth is trained to be in inspecting relation to the screen and close to the top of the table on its way to the mandrel.

6. A device of the class described having a winding mandrel, an inspection screen, and a roll below the screen and around which the fabric passes after leaving the inspection screen and on its way to the mandrel, a fabric support above the screen over and downwardly from which the fabric passes in front of the screen, a pair of fabric width gauges slidable on said support and means for setting each and an opaque shield attached to each gauge and so positioned and adapted as to cover those areas of the screen not covered by the fabric.

7. A device of the class described having an upright inspection screen, a bar above the screen over which the fabric is trained to pass downwardly in front of the screen, a pair of fabric width gauges slidable on the bar and means for setting each, each gauge leaving an inner vertical gauge surface, and an opaque shield for each gauge attached to the front of the corresponding gauge in parallelism with the face of the screen, with the inner upright edge of each shield flush with said inner vertical surface of its gauge, and said shields extending outwardly from said upright inner edges, whereby to cover such portions of the screen as are not covered by the fabric which lies between the said inner vertical surfaces of said gauges.

8. A fabric measuring and inspection machine comprising a table having disposed in linear sequence thereon, a fabric supply receptacle, an illuminated inspection screen, and a measuring roll which is close to the top surface of the table, all of the devices being above the top of the table, and a winding mandrel at the end of and at a level below the table top, the devices being so arranged that the fabric is trained from the supply receptacle, over the top of the screen, thence downwardly in front of the screen, thence around the measuring roll to a point immediately adjacent the top of the table, thence close to said top and to the mandrel, said measuring roll having operated thereby at one end a yardage indicator, and at the opposite end a device indicating the number of pieces of fabric inspected.

9. A device of the class described comprising a table, having a winding mandrel at one end so adapted and mounted that the cloth drags against the corner of the table and lies flatly and close to the table while being wound, and so that an operator seated at the table can remove the wound material from the mandrel, said table having on and rising therefrom an upright inspection screen viewable by the seated operator and having an inspection light, a support above the screen and a measuring roll below the screen close to the top surface of the table and over which support and roll the cloth is trained to be in inspecting relation to the screen and close to the top of the table on its way to the mandrel, and electrically controlled means for operating the winding mandrel and controlling said inspection light, including a switch accessible by the seated operator while in a position to inspect or to remove the wound material from the mandrel.

RUDOLPH G. BIRR.
PAUL W. JESPERSEN.

References Cited in the file of this patent

UNITED STATES PATENTS

| Number | Name | Date |
| --- | --- | --- |
| 40,962 | Swany | Dec. 15, 1863 |
| 184,677 | Wayland | Nov. 21, 1876 |
| 758,322 | Krause | Apr. 26, 1904 |
| 854,467 | Cottrell | May 21, 1907 |
| 873,454 | Normandin | Dec. 10, 1907 |
| 976,541 | Blevins et al. | Nov. 22, 1910 |
| 1,094,672 | Milentz | Apr. 28, 1914 |
| 1,204,664 | Jackson | Nov. 14, 1916 |
| 1,245,242 | Kohn | Nov. 6, 1917 |
| 1,515,289 | Tullis | Nov. 11, 1924 |
| 1,569,646 | Thomas | Jan. 12, 1926 |
| 1,696,287 | Sommaripa et al. | Dec. 25, 1928 |
| 1,930,077 | Bentley | Oct. 10, 1933 |
| 2,010,891 | Raymond | Aug. 13, 1935 |
| 2,105,715 | Birch | Jan. 18, 1938 |
| 2,128,709 | Kramer | Aug. 30, 1938 |
| 2,174,848 | Stahmer | Oct. 3, 1939 |